US012640490B2

(12) United States Patent
Khawand et al.

(10) Patent No.: US 12,640,490 B2
(45) Date of Patent: May 26, 2026

(54) ANTENNA ARRAY EMBEDDED IN THINNED REGION OF DISPLAY PANEL

(71) Applicant: Microsoft Technology Licensing, LLC, Redmond, WA (US)

(72) Inventors: Charbel Khawand, Sammamish, WA (US); Apoorva Sharma, Sammamish, WA (US); Andrew James Hillenius, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 218 days.

(21) Appl. No.: 18/198,655

(22) Filed: May 17, 2023

(65) Prior Publication Data

US 2024/0388003 A1 Nov. 21, 2024

(51) Int. Cl.

| | |
|---|---|
| ***H01Q 1/22*** | (2006.01) |
| ***H01Q 1/24*** | (2006.01) |
| ***H01Q 15/08*** | (2006.01) |
| ***H01Q 21/00*** | (2006.01) |

(52) U.S. Cl.

CPC ......... *H01Q 15/08* (2013.01); *H01Q 21/0068* (2013.01)

(58) Field of Classification Search

CPC ............ H01Q 1/22; H01Q 1/27; H01Q 1/273; H01Q 1/2283; H01Q 1/24; H01Q 1/243; H01Q 1/38; H01Q 15/08; H01Q 21/00; H01Q 21/0068; H01Q 3/36

See application file for complete search history.

(56) References Cited

U.S. PATENT DOCUMENTS

| | | | | |
|---|---|---|---|---|
| 6,005,524 | A * | 12/1999 | Hayes | H01Q 1/40 343/702 |
| 6,421,013 | B1 * | 7/2002 | Chung | H01L 21/56 235/441 |
| 7,692,591 | B2 * | 4/2010 | Kato | H01Q 1/38 343/702 |
| 9,912,044 | B2 * | 3/2018 | Iijima | G04R 60/06 |
| 11,165,155 | B2 * | 11/2021 | Huh | H01Q 1/38 |
| 11,626,455 | B2 * | 4/2023 | Kim | H04M 1/0269 361/814 |
| 11,658,395 | B2 * | 5/2023 | Kim | H01Q 1/44 343/702 |
| 11,847,001 | B2 * | 12/2023 | Lee | H01Q 1/2266 |
| 12,142,817 | B2 * | 11/2024 | Oh | H01Q 21/08 |
| 2004/0252191 | A1 | 12/2004 | Davis | |

(Continued)

OTHER PUBLICATIONS

International Search Report and Written Opinion received for PCT Application No. PCT/US2024/026713, Jul. 10, 2024, 18 pages.

*Primary Examiner* — Tho G Phan

(74) *Attorney, Agent, or Firm* — Ray Quinney & Nebeker P.C.; Paul N. Taylor

(57) ABSTRACT

The disclosed technology is generally directed to an antennary array embedded in a thinned region of a display panel. In one example of the technology, an apparatus comprises a display panel and a first antenna. The display panel is composed of a dielectric material. The display panel includes a first portion. An outer surface of the first portion is planar. The first portion includes a first region and a thinned region. The first region has a thickness. The thinned region has a thickness that is less than half of the thickness of the first region. The first antenna is embedded in the thinned region.

20 Claims, 6 Drawing Sheets

200

(56) References Cited

U.S. PATENT DOCUMENTS

| | | | |
|---|---|---|---|
| 2020/0021016 | A1 | 1/2020 | Son |
| 2020/0411969 | A1 | 12/2020 | Wang |
| 2021/0307173 | A1 | 9/2021 | Lenhardt |

* cited by examiner

200

300

400

ANTENNA ARRAY EMBEDDED IN THINNED REGION OF DISPLAY PANEL

BACKGROUND

A phased array antenna is an array of antennas which projects a beam of radio waves that can be steered to point in different directions without moving the antennas. There are many different types of phased array antennas. An ultra-wideband (UWB) phased array antenna is a phased array of UWB antennas, where a UWB antenna is an antenna with a fractional bandwidth greater than 0.2 and a minimum bandwidth of 500 MHz. UWB antennas have many applications, including voice and data transmission using digital pulses, allowing a very low-powered and relatively low-cost signal to carry information at very high data rates within a restricted range.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to an antenna array embedded in a thinned region of a display panel. In one example of the technology, an apparatus comprises a display panel and a first antenna. The display panel is composed of a dielectric material. The display panel includes a first portion. An outer surface of the first portion is planar. The first portion includes a first region and a thinned region. The first region has a thickness. The thinned region has a thickness that is less than half of the thickness of the first region. The first antenna is embedded in the thinned region.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Phased array antennas occupy a somewhat larger than usual space relative to typical antennas and are environment-sensitive structures. In some examples, antenna elements, such as a phased array antenna, are embedded in the display panel, such as a glass display panel, of a mobile device without hindering the performances of the antenna elements and wireless technology used by the mobile device. In some examples, the antenna elements are embedded in a thinned region of the display panel. Use of such a thinned region allows the antenna structure embedded in the display panel to have no impairment imposed by mechanical constraints in the mobile device, allowing the best antennas to be used in the mobile device without impairment.

In some examples, an epoxy or liquid adhesive is used to backfill the antenna structure, creating an overall more stable environment around the antenna elements. In these examples, such a backfill allows the manufacturability and placement of antenna elements to be easier and more controlled, which also allows for greater specialization in the manufacturing. In some examples, the mobile device also uses a selective epoxy keepout to force an air gap around the radiating elements of the antennas embedded in the display panel.

Illustrative Systems

Figure 1:
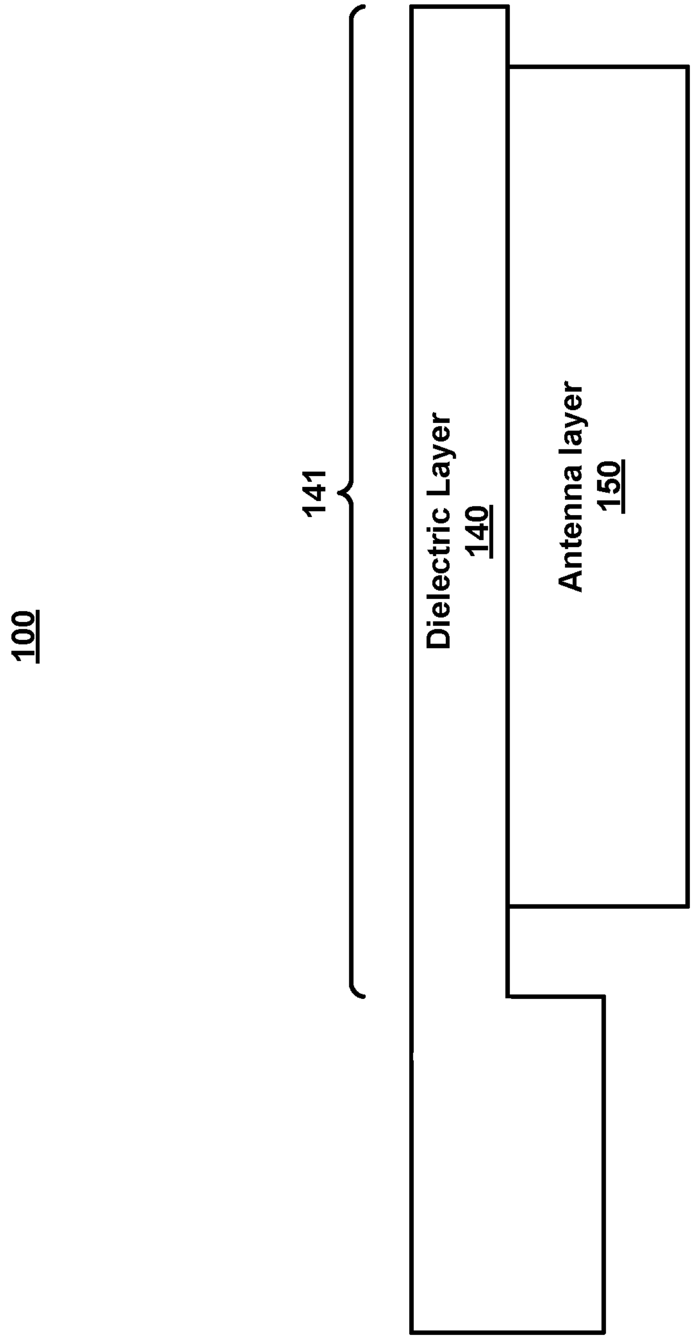
FIG. 1 shows a side view of an example system that includes a substrate with an embedded antenna layer.

FIG. 1 shows a side view of an example of system (100). FIG. 1 and the corresponding description of FIG. 1 in the specification illustrate an example system for illustrative purposes that does not limit the scope of the disclosure. System 100 is described as follows in accordance with some examples.

System 100 includes dielectric layer 140 and antenna layer 150. Antenna layer 150 is embedded in dielectric layer 140. Dielectric layer 140 is a substrate is composed of a dielectric such as glass, a suitable plastic, a suitable glass-reinforced epoxy laminate material such as a flame-retardant 4 (FR4) material, or other suitable low-loss dielectric material. Part or all of dielectric layer 140 has a planar outer surface. In some examples, dielectric layer 140 is a display panel, such as a glass display panel. In some examples, system 100 is part of a mobile device, and dielectric layer 140 is a touch screen for the mobile device. In some examples, dielectric layer 140 includes a thinned region 141 than is thinned relative to the rest of the dielectric layer. For instance, in some examples, thinned region 141 is less than half of the thickness of the rest of the dielectric layer, and thinned region 141 has a thickness that is less than 0.5 mm.

Antenna layer 150 includes one or more antennas or antenna elements. In some examples, antenna layer 150 includes a phased antenna array, such as a UWB phased antenna array. The antenna elements in antenna layer 150 have connections to other components. Antenna layer 150 is embedded in the thinned region 141 of dielectric layer 140. Antenna layer 150 is embedded in the thinned region 141 of dielectric layer 140 in different ways in different examples. For instance, in some examples, the antennas in antenna layer 150 are recessed into dielectric layer 140. In some examples, dielectric layer 140 is cut all the way through to embed antenna layer 150 and create a separable component that blends in with the rest of dielectric layer 140. Antenna layer 150 is embedded in dielectric layer 140 with the help of adhesive and epoxy. In some examples, display panel 140 includes at least one bevel or at least one radius cut.

Although not shown in FIG. 1, in some examples, a dielectric filler material such as epoxy, liquid adhesive, glass, or the like is used to backfill the structure of antenna layer 150. Although not shown in FIG. 1, in some examples, there is a selective keepout such as a spacer or a ring of foam that is used to force an airgap around radiating elements in antenna layer 150.

Figure 2:
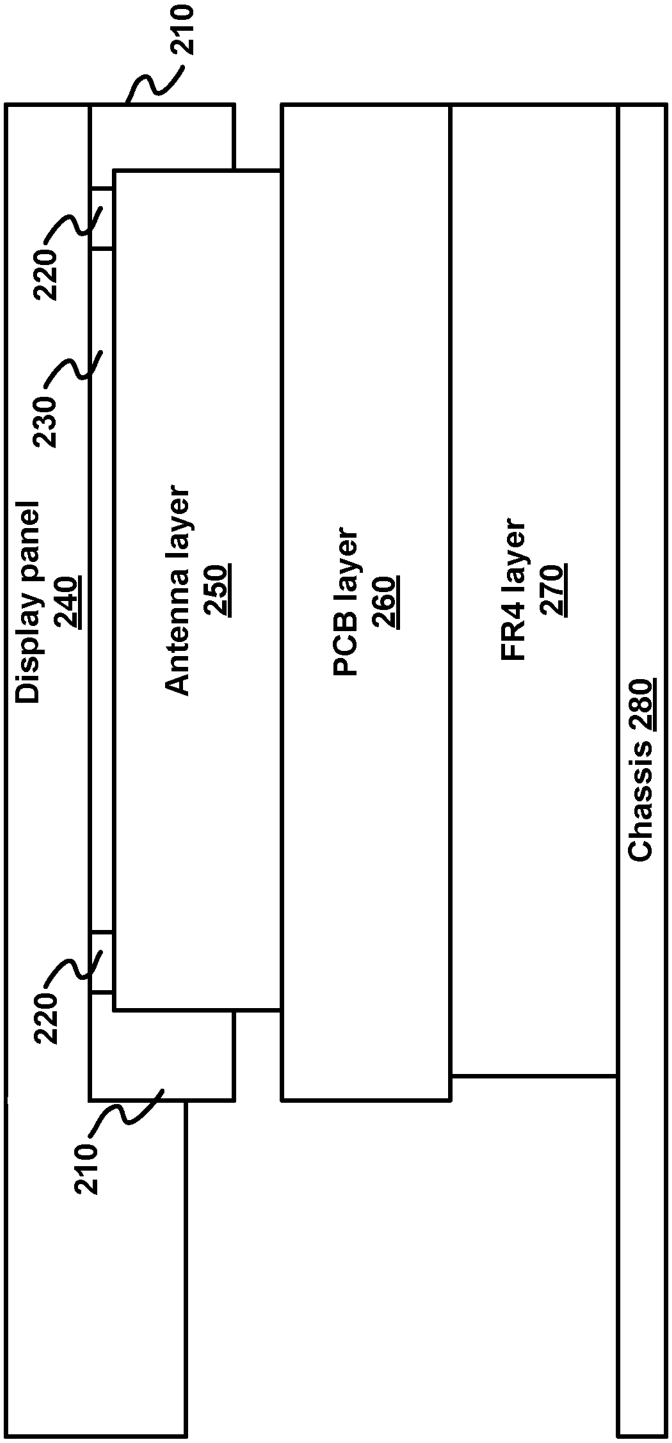
FIG. 2 shows a side view of a device that includes an example of the system of FIG. 1.

FIG. 2 shows a side view of a device that includes an example of device 200. Device 200 may include an example of system 100 of FIG. 1. In some examples, device 200 is a mobile device such as a smart phone, tablet, or the like that may be an example of device 600 of FIG. 6. Device 200 is described as follows in accordance with some examples.

Device 200 includes display panel 240, epoxy layer 210, selective epoxy keepout 220, air gap 230, antenna layer 250, PCB layer 260, FR4 layer 270, and chassis 280. Antenna layer 250 includes antenna elements, such as a UWB phased array antenna. Device 200 is a mobile device that provides a variety of functions including external communication. The external communication performed by device 200 may be performed in a variety of manners, some of which make use of antenna elements in antenna layer 250. PCB layer 260 is composed of PCB and acts as a carrier substrate for holding antenna layer 250. FR4 layer 270 is composed of an FR4 material. Chassis 280 is a metal chassis for device 200. Although not shown in FIG. 2, the antenna elements in antenna layer 240 include connections to other components within chassis 280, where the connections go through PCB layer 260 and FR4 layer 270.

Antenna layer 250 is embedded in display panel 240. Display panel 240 is a display panel for device 200. Display panel 240 has a planar outer surface. In some examples, display panel 240 is a touch and display panel coverglass. As shown in FIG. 2, display panel 240 is stepped to make display panel 240 thinner in the region of display panel 240 in which antenna layer 240 is embedded, so that there is a stepped transition from the portion of the display panel 240 that is not thinned to the thinned portion of display panel 240. In some examples, the thickness of display panel 240 in the thinned region in which antenna layer 240 is embedded is less than half of the thickness of display panel 240 elsewhere, and the thinned region is less than 0.5 mm in thickness. For instance, in one example, display panel 240 is composed of 0.4 mm thickness glass in the region in which antenna array 240 is embedded, and display panel 240 is composed of 1.2 mm thickness glass elsewhere.

The thinned region of display panel 240 in which antenna layer 250 is embedded allows the antenna structure in antenna layer 250 embedded in the display panel to have no impairment imposed by mechanical constraints in device 200, allowing better antennas to be used in device 200 without such restraints. For instance, in some examples, antenna layer 250 includes a phased array antenna that provides a 3-D spatial radar and a time-of-light detector with high performance. Typically, a mobile device works around antenna pressures by reducing antenna size, sharing antennas among technologies, or skipping features such as mmWave and UWB entirely. However, by using a thinned region in display panel 240, device 200 allows a phased array antenna to be embedded within the glass structure of display panel 240 without compromising the performance of the antennas and wireless technologies used by device 200, including maintaining a stable phased array phase response, and while also maintaining the strength of display panel 240.

Figure 3:
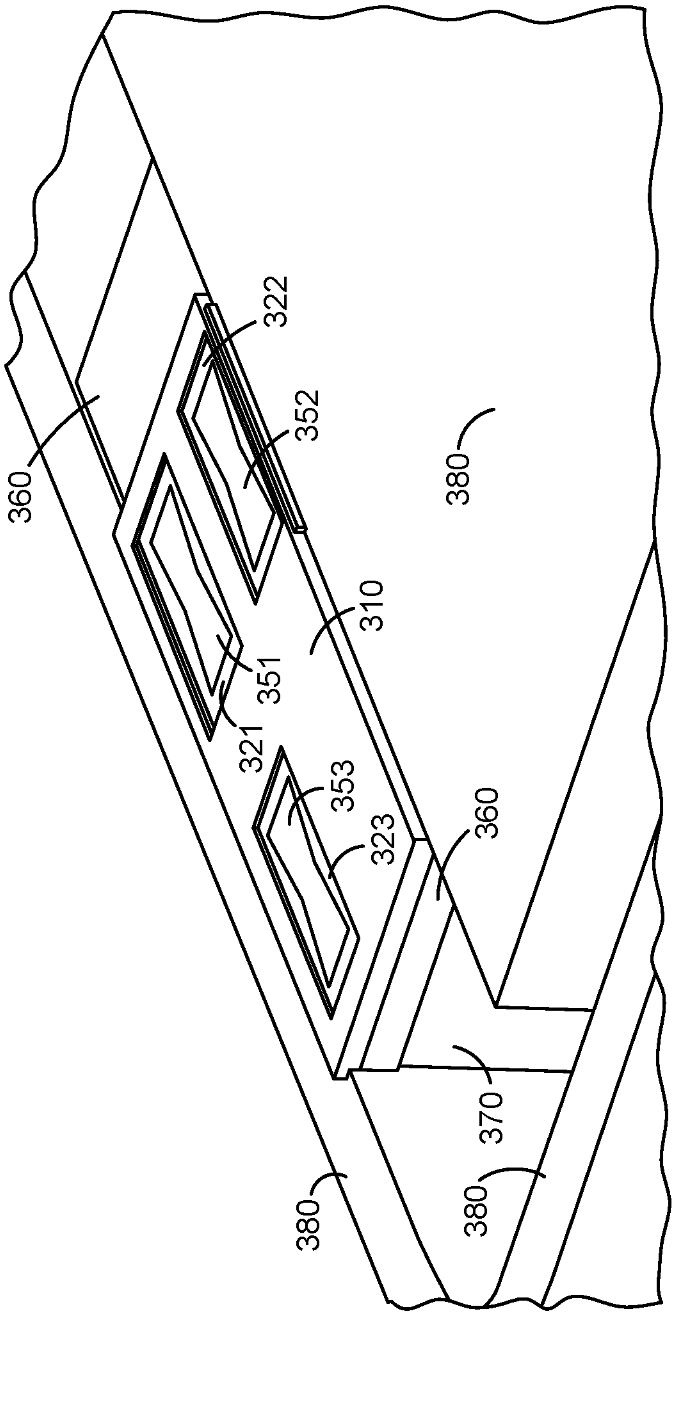
FIG. 3 shows an isometric cutaway view of an example of the device of FIG. 2.

FIG. 3 shows an isometric cutaway view of an example of device 300. Device 300 may be an example of device 200 of FIG. 2. Device 300 includes epoxy layer 310, antenna 351, antenna 352, antenna 353, dielectric spacer 321, dielectric spacer 322, dielectric spacer 323, PCB layer 360, FR4 layer 370, and metal chassis 380.

Although not shown in FIG. 3, device 300 includes a glass display panel that sits over the of the portion of device 300 shown in FIG. 3. The glass display panel has a uniform surface at the top of device 300. The glass display panel is stepped and has a reduced thickness in the portion at the top of epoxy layer 310, since epoxy layer 310 extends higher than the other elements undeath the glass display panel, in order to accommodate the size of antennas 351-353.

Returning to FIG. 2, epoxy layer 210 is a backfill layer that is composed of an epoxy backfill separating antenna layer 250 from display panel 240. Epoxy layer 210 creates an overall more stable environment around the antenna elements of antenna layer 250. Epoxy layer 210 allows the manufacturability and placement of antenna elements to be easier and more controlled, which also allows for greater specialization in the manufacturing. In some examples, epoxy layer 210 may be replaced by a layer with a dielectric filler material other than epoxy such as liquid adhesive, glass, or the like.

Epoxy keepout 220 is a selective keepout that enforces air gap 230 around the radiating parts of antenna layer 250 in order to ensure consistency for the antenna elements in antenna layer 250 in spite of manufacturing variations in the epoxy of epoxy layer 210. Epoxy does not have a particularly well-controlled dielectric property, and epoxy tends to be somewhat lossy. Additionally, it can be difficult to control the overall fill height when backfilling the epoxy of epoxy layer 210, to ensure consistency in the backfill including ensuring that there are no air bubbles in the epoxy. Further, display panel 240 may have its own varying dielectric properties that affect both the tuning of antennas in antenna layer 250 and the phase response.

In some examples the manufacturing variations are within acceptable margins for the particular antenna design, such as for certain frequencies or applications that are not as critical for the dielectric. Also, in some examples, some antenna geometries may be small or controlled enough to embed them without risk of air bubbles. Accordingly, in some examples, device 200 includes epoxy layer 210 but does not include epoxy keepout 220 or air gap 230, and instead epoxy layer 210 reaches to antenna layer 250.

However, in tighter controlled applications, an air gap may be very beneficial, and accordingly some examples of device 200 include epoxy keepout 220 and air gap 230. Some examples of device 200 includes a selective keepout such as epoxy keepout 220 and air gap 230 and use an example of display panel 240 that does not have a thinned region. Examples of device 200 that do not have a thinned region in display panel 240 include an air gap such as air gap 230 that is enforced by a selective keepout such as epoxy keepout 220. Air gap 230 prevents the epoxy in epoxy layer 210 from being the dominant dielectric that the radiant antenna elements in antenna layer 250 see. In some examples, air gap 230 is about 0.1 mm in thickness.

In various examples, epoxy keepout 220 may include a ring of foam or a spacer composed of a dielectric such as pressure-sensitive adhesive tape (PSA), foam, or the like. In some examples, the foam is a polyurethane foam or the like. Epoxy keepout 220 dams off the edges of patch antennas in antenna layer 250 so that, during manufacture, when epoxy is backfilled to form epoxy layer 210, epoxy keepout 220 sets the height for the antenna. In this way, the epoxy fills around the antenna element, but the epoxy does not fill the critical gap between patch of the patch antennas and display panel 240, and there is no epoxy over the top of the conductor elements on the patch of the patch antennas.

In some examples, as shown in FIG. 2, epoxy keepout 220 seals both edges around the top of antenna layer 250 so that epoxy does not enter the critical region of antenna layer 250 while epoxy is being backfilled to form epoxy layer 210 during the manufacture of device 200, thus enforcing air gap 230 over the top of the critical portion of antenna layer 250. In some examples, instead of sealing off just the edge as illustrated in FIG. 2, epoxy keepout 220 is over the entire surface of the critical region at the top of antenna layer 250 to prevent epoxy from creeping into the critical region of antenna layer 250 while epoxy is being backfilled to form epoxy layer 210 during the manufacture of device 200, thus enforcing air gap 230 over the top of the critical portion of antenna layer 250. In some examples, in addition to epoxy keepout 220 and air gap 230, device 200 also includes a uniform plastic layer between display panel 240 and the antennas of antenna layer 250.

In some examples, rather than using epoxy keepout 220 and air gap 230, a contiguous layer of foam is used to separate critical areas of antenna layer 250 from epoxy layer 210 (or other dielectric filler), where the layer of foam prevents the epoxy from being able to flow to critical areas of antenna layer 250 during device manufacture. In other examples, rather than using epoxy keepout 220 and air gap 230, a piece of plastic is positioned over the top of antenna layer 250 so that when the epoxy (or other dielectric filler) is backfilled to form antenna layer 250, the critical gap space is taken up by the piece of plastic. For instance, in some examples, the piece of plastic is 0.1 mm thick. The piece of plastic is well-controlled (in terms of the dielectric constant of the plastic). In other examples, rather than using epoxy keepout 220, high pressure may be used to keep the dielectric filler from flowing into critical areas of antenna layer 250 during manufacture of device 200.

In other examples, rather than using epoxy layer 210 or epoxy keepout 220, a different height is molded into the bottom of display panel 240 over the antenna elements so that air gap 230 is preserved by the geometry of display panel 240 and prevents glass from display panel 240 from entering the critical area around the antennas of antenna layer 250. In various examples, the critical area is separated from the glass by behind held mechanically or by being manufactured into the glass of display panel 240. Also, in some examples, rather than separating the critical gap space with an air gap, the air gap is replaced with any suitable low-loss dielectric RF-transparent material, such as vacuum, a well-controlled low-loss ceramic, a suitable plastic, a suitable foam, or the like, that is disposed between display panel 240 and antenna layer 250. In some examples, the material used instead of air has a loss tangent less than about 0.004 and a dielectric constant less than about three.

FIG. 2 shows an example of device 200 in which display panel 240 is stepped to make display panel 240 thinner in the region of display panel 240 in which antenna layer 250 is embedded. In some examples, in addition to being stepped, display panel 240 includes bevels or radius cuts. For instance, in some examples, about ½ of a millimeter radius is used on the bevels. In these examples, the bevels or radius cuts reduce stress risers in the glass of display panel 240. In these examples, the bevels or radius cuts provide smooth transitions that reduce the potential for cracking or fracturing of the glass of display panel 240 while device 200 is being assembled.

Figure 4:
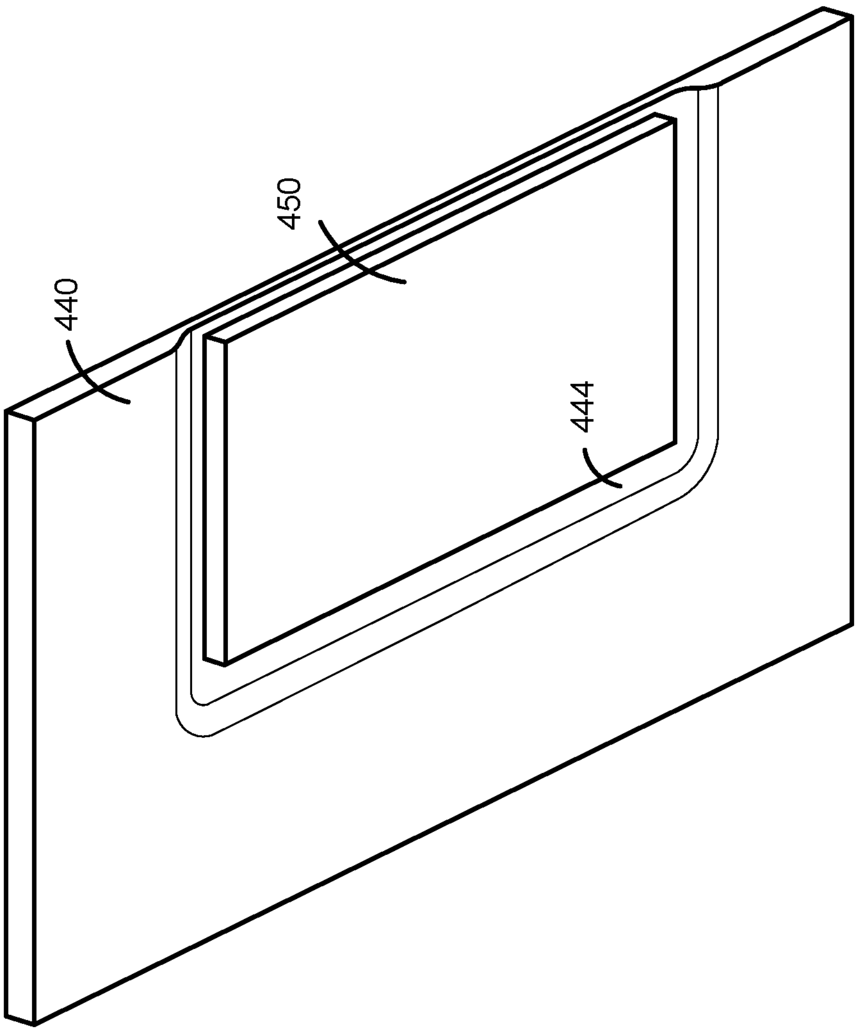
FIG. 4 is an isometric cutaway view of an example of the device of FIG. 2 in which the display panel includes bevels.

For instance, FIG. 4 shows an example of a device with a display panel that includes bevels. FIG. 4 is an isometric cutaway view of an example of device 400. Device 400 may be employed as an example of device 200 of FIG. 2. Device 400 includes display panel 440 and antenna layer 450. Display panel 440 includes bevels 444. Bevels 444 reduce stress risers in the glass of display panel 440. In these examples, bevels 444 provide smooth transitions that reduce the potential for cracking or fracturing of the glass of display panel 440 while device 400 is being assembled.

Returning to FIG. 2, in some examples, display panel 240 is a complete, contiguous display panel. In some examples, a portion of display panel 240 in which antenna layer 250 is embedded is separable from the overall display panel 240, as follows. The separable portion is a removable cutout piece that is integrated into the rest of display panel 240. The separable portion of display panel 240 can be removed or replaced in the rest of display panel 240 during manufacturing. The piece is not removable post-manufacture, but rather is a separate piece for ease of manufacturing. The separable portion includes antenna layer 240, which is embedded in the separable portion of display panel 240. The separable piece can keystone into a mating hole in the rest of the glass of display panel 240 and glue in place with a glue fillet around the outside of the frame of the separable piece.

In some examples, display panel 240 includes one or more cosmetic features to visually obscure antenna layer 250 and to create a uniform appearance of the glass color, surface, and texture of display panel 240, including the portions of display panel 240 above antenna layer 250 and the portion of display panel 240 not above antenna 240. In some examples, the cosmetic features include a black mask cosmetic finish applied over the display panel 240, including the thinned portion of display panel 240. In examples of device 200 that use a separable portion as discussed above, the cosmetic finish may be re-applied after placing the separable portion of display panel 240 into the rest of display panel 240.

Device 200 further includes various other components that enable device 200 to operate as a mobile device, such as components discussed in further detail in FIG. 5 below. In some examples, these components provide power to antenna elements antenna layer 250, control the antenna elements, and enable various forms of external communication via the antenna elements in conjunction with various operations performed via device 200.

Illustrative Processes

Figure 5:
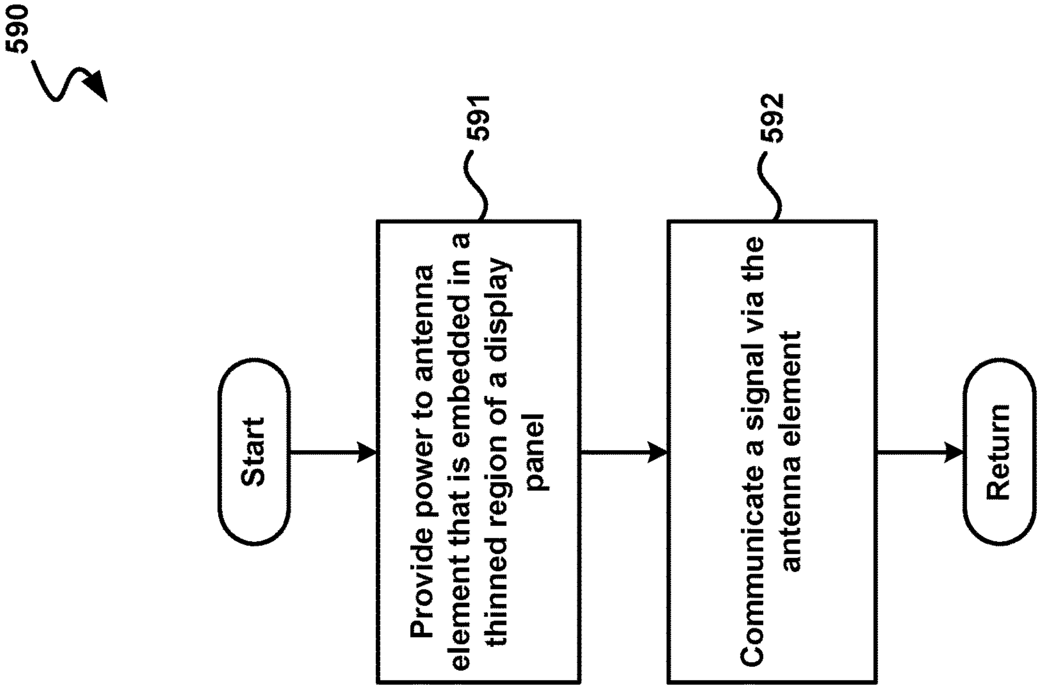
FIG. 5 is a flow diagram illustrating an example process for an antenna element embedded in a thinned region of a display panel.

FIG. 5 is a diagram illustrating an example dataflow. In some examples, process 590 proceeds as follows. The steps of process 590 are performed by a mobile device such as mobile device 200 of FIG. 2 or mobile device 300 of FIG. 3.

Step 591 occurs first. At step 591, power is provided to a first antenna element that is embedded in a thinned region of a plurality of regions of a display panel. The display panel is composed of a dielectric material. An outer surface of the display panel is planar. The thinned region is thinned relative to the other regions of the plurality of regions of the display panel. As shown, step 592 occurs next. At step 592, a signal is communicated via at least the first antenna element. The process then advances to a return block, where other processing is resumed.

Illustrative Computing Device

Figure 6:
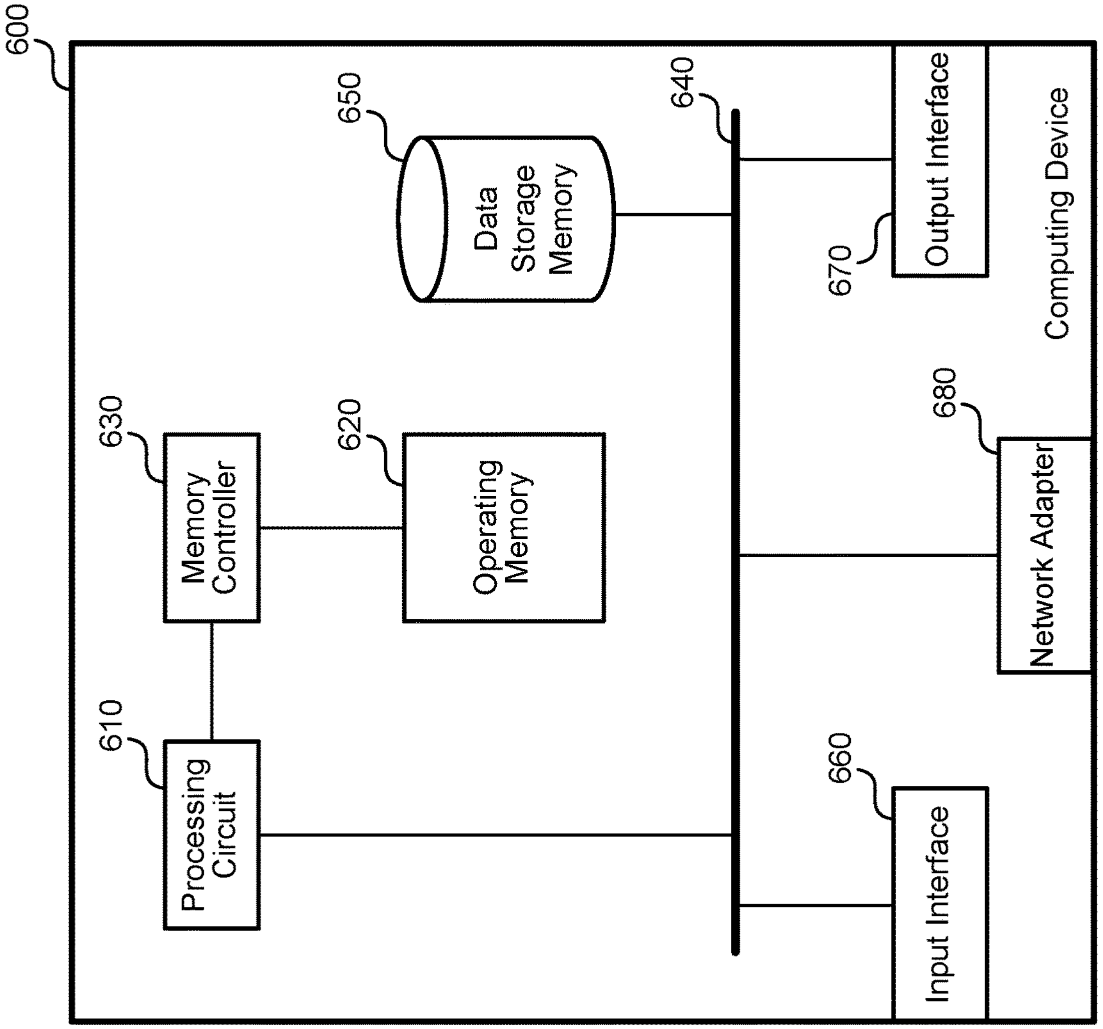
FIG. 6 is a block diagram illustrating one example of a suitable computing device, according to aspects of the disclosed technology.

FIG. 6 is a diagram illustrating one example of computing device 600 in which aspects of the technology may be practiced. Computing device 600 may be virtually any type of general- or specific-purpose computing device. For example, computing device 600 may be a user device such as a desktop computer, a laptop computer, a tablet computer, a display device, a camera, a printer, or a smartphone.

Likewise, computing device 600 may also be a server device such as an application server computer, a virtual computing host computer, or a file server computer. In some examples, computing device 600 is a mobile device that is an example of device 200 of FIG. 2 or device 300 of FIG. 3. In some examples, the components illustrated in FIG. 6 are contained within chassis 280 of device 200 of FIG. 2 or metal chassis 380 device 300 of FIG. 3. As illustrated in FIG. 6, computing device 600 may include processing circuit 610, operating memory 620, memory controller 630, bus 640, data storage memory 650, input interface 660, output interface 670, and network adapter 680. Each of these afore-listed components of computing device 600 includes at least one hardware element.

Computing device 600 includes at least one processing circuit 610 configured to execute instructions, such as instructions for implementing the herein-described workloads, processes, and/or technology. Processing circuit 610 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 620 during run-time of computing device 600. Operating memory 620 may also include any of a variety of data storage devices/components, such as volatile memories, semi-volatile memories, random access memories, static memories, caches, buffers, and/or other media used to store run-time information. In one example, operating memory 620 does not retain information when computing device 600 is powered off. Rather, computing device 600 may be configured to transfer instructions from a non-volatile data storage component (e.g., data storage component 650) to operating memory 620 as part of a booting or other loading process. In some examples, other forms of execution may be employed, such as execution directly from data storage component 650, e.g., execute In Place (XIP).

Operating memory 620 may include 4th generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 610 via memory controller 630 in channels. One example of computing device 600 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above discussion, operating memory 620 specifically does not include or encompass communications media, any communications medium, or any signals per se.

Memory controller 630 is configured to interface processing circuit 610 to operating memory 620. For example, memory controller 630 may be configured to interface commands, addresses, and data between operating memory 620 and processing circuit 610. Memory controller 630 may also be configured to abstract or otherwise manage certain aspects of memory management from or for processing circuit 610. Although memory controller 630 is illustrated as single memory controller separate from processing circuit 610, in other examples, multiple memory controllers may be employed, memory controller(s) may be integrated with operating memory 620, and/or the like. Further, memory controller(s) may be integrated into processing circuit 610. These and other variations are possible.

In computing device 600, data storage memory 650, input interface 660, output interface 670, and network adapter 680 are interfaced to processing circuit 610 by bus 640. Although FIG. 6 illustrates bus 640 as a single passive bus, other configurations, such as a collection of buses, a collection of point-to-point links, an input/output controller, a bridge, other interface circuitry, and/or any collection thereof may also be suitably employed for interfacing data storage memory 650, input interface 660, output interface 670, and/or network adapter 680 to processing circuit 610.

In computing device 600, data storage memory 650 is employed for long-term non-volatile data storage. Data storage memory 650 may include any of a variety of non-volatile data storage devices/components, such as non-volatile memories, disks, disk drives, hard drives, solid-state drives, and/or any other media that can be used for the non-volatile storage of information. However, data storage memory 650 specifically does not include or encompass communications media, any communications medium, or any signals per se. In contrast to operating memory 620, data storage memory 650 is employed by computing device 600 for non-volatile long-term data storage, instead of for run-time data storage.

Also, computing device 600 may include or be coupled to any type of processor-readable media such as processor-readable storage media (e.g., operating memory 620 and data storage memory 650) and communication media (e.g., communication signals and radio waves). While the term processor-readable storage media includes operating memory 620 and data storage memory 650, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 600 also includes input interface 660, which may be configured to enable computing device 600 to receive input from users or from other devices. In addition, computing device 600 includes output interface 670, which may be configured to provide output from computing device 600. In one example, output interface 670 includes a frame buffer, graphics processor, graphics processor or accelerator, and is configured to render displays for presentation on a separate visual display device (such as a monitor, projector, virtual computing client computer, etc.). In another example, output interface 670 includes a visual display device and is configured to render and present displays for viewing. In yet another example, input interface 660 and/or output interface 670 may include a universal asynchronous receiver/transmitter (UART), a Serial Peripheral Interface (SPI), Inter- Integrated Circuit (I2C), a General-purpose input/output (GPIO), and/or the like. Moreover, input interface 660 and/or output interface 670 may include or be interfaced to any number or type of peripherals.

In the illustrated example, computing device 600 is configured to communicate with other computing devices or entities via network adapter 680. Network adapter 680 may include a wired network adapter, e.g., an Ethernet adapter, a Token Ring adapter, or a Digital Subscriber Line (DSL) adapter. Network adapter 680 may also include a wireless network adapter, for example, a Wi-Fi adapter, a Bluetooth adapter, a ZigBee adapter, a Long-Term Evolution (LTE) adapter, SigFox, LoRa, Powerline, or a 6G adapter.

Although computing device 600 is illustrated with certain components configured in a particular arrangement, these components and arrangements are merely one example of a computing device in which the technology may be employed. In other examples, data storage memory 650, input interface 660, output interface 670, or network adapter 680 may be directly coupled to processing circuit 610 or be coupled to processing circuit 610 via an input/output controller, a bridge, or other interface circuitry. Other variations of the technology are possible.

Some examples of computing device 600 include at least one memory (e.g., operating memory 620) having processor-executable code stored therein, and at least one processor (e.g., processing unit 610) that is adapted to execute the processor-executable code, wherein the processor-executable code includes processor-executable instructions that, in response to execution, enables computing device 600 to perform actions, where the actions may include, in some examples, actions for one or more processes described herein, such as the process shown in FIG. 4, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:

a display panel including a glass structure, the glass structure including:

an outer surface that is planar;

a bottom surface opposite the outer surface; and a thinned region formed in the bottom surface of the glass structure; and an antenna layer that is embedded in the thinned region of the glass structure of the display panel.

2. The apparatus of claim 1, wherein the glass structure is one or more of glass, plastic, or a glass-reinforced epoxy laminate material.

3. The apparatus of claim 1, wherein the thinned region is a removable cutout piece that is integrated into the display panel.

4. The apparatus of claim 1, wherein the display panel has at least one cosmetic feature that visually obscures the antenna layer.

5. The apparatus of claim 1, wherein the apparatus is a mobile device, and wherein the display panel is a touch screen of the mobile device.

6. The apparatus of claim 1, wherein a thickness of the thinned region is less than 0.5 millimeters.

7. The apparatus of claim 1, further comprising a low-loss dielectric material disposed between the bottom surface of the glass structure of the display panel and the antenna layer, wherein the low-loss dielectric material has a loss tangent that is less than about 0.004 and a dielectric constant that is less than about three.

8. The apparatus of claim 7, wherein the low-loss dielectric material is at least one of air, vacuum, a well-controlled low-loss ceramic material, plastic, or foam.

9. The apparatus of claim 1, further comprising:

a backfill layer that is disposed between the glass structure of the display panel and the antenna layer, wherein the backfill layer is composed of a dielectric filler material.

10. The apparatus of claim 9, wherein the dielectric filler material is at least one of epoxy or a liquid adhesive.

11. The apparatus of claim 9, further comprising:

an air gap that is disposed between the backfill layer and the antenna layer.

12. The apparatus of claim 1, wherein the antenna layer includes a plurality of antennas that are embedded in the thinned region.

13. The apparatus of claim 12, wherein the plurality of antennas comprise an ultra wideband (UWB) phased array antenna.

14. The apparatus of claim 1, further comprising an air gap at the thinned region between the antenna layer and the bottom surface of the glass structure of the display panel.

15. The apparatus of claim 14, further comprising a backfill layer between the antenna layer and the bottom surface of the glass structure of the display panel.

16. The apparatus of claim 15, wherein the backfill layer is an epoxy layer for adhering the antenna layer to the bottom surface of the glass structure of the display panel.

17. The apparatus of claim 15, further comprising a backfill keepout between the antenna layer and the bottom surface of the glass structure of the display panel and surrounding a radiating region of the antenna layer, wherein the backfill keepout forms an air gap by preventing the backfill layer from being disposed between the radiating region of the antenna layer and the bottom surface of the glass structure of the display panel.

18. The apparatus of claim 1, wherein the antenna layer is a phase array antenna.

19. An apparatus, comprising:

a substrate composed of a glass structure, the glass structure including:

an outer surface that is planar;

a bottom surface opposite the outer surface; and a thinned region formed in the bottom surface of the glass structure of the substrate that is thinned relative to other regions of the glass structure of the substrate; and an antenna layer that is embedded in the thinned region.

20. A mobile device, comprising:

a touchscreen display panel comprising a dielectric material, including:

an outer surface that is planar;

a bottom surface opposite the outer surface that faces a chassis of the mobile device; and a recess formed in the bottom surface of the touchscreen display panel;

a phased array antenna that is embedded in the recess and having a radiating region that faces the bottom surface of the touchscreen display panel; and an epoxy layer position in the recess and adhering the phased array antenna to the bottom surface of the touchscreen display panel, wherein the epoxy layer includes an air gap formed therein around the radiating region of the phased array antenna and between the phased array antenna and the bottom surface of the touchscreen display panel.

* * * * *